(12) United States Patent
Kimura et al.

(10) Patent No.: US 6,954,419 B1
(45) Date of Patent: Oct. 11, 2005

(54) DISK REPRODUCTION DEVICE WITH IMPROVED MULTI-ANGLE SWITCHING

(75) Inventors: Masaru Kimura, Iwaki (JP); Mitsuhiro Murata, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 09/547,943

(22) Filed: Apr. 11, 2000

(30) Foreign Application Priority Data

Apr. 14, 1999 (JP) .......................................... 11-107263
Apr. 14, 1999 (JP) .......................................... 11-107267

(51) Int. Cl.$^7$ .............................. G11B 7/24; H04N 5/91
(52) U.S. Cl. ...................... 369/275.3; 386/95; 386/126
(58) Field of Search .......................... 386/95, 126, 102, 386/45, 108, 46, 125, 98, 105, 106, 111, 83; 360/27, 69; 369/275.3, 32.01

(56) References Cited

U.S. PATENT DOCUMENTS 5,825,727 A    10/1998  Han .............................. 386/46
6,049,654 A *  4/2000   Furuta et al. .................. 386/95
6,311,013 B1 * 10/2001  Shimizu et al. ............. 386/111
6,396,997 B2 *  5/2002  Moriyama et al. ............ 386/46

* cited by examiner

Primary Examiner—Ali Neyzari
(74) Attorney, Agent, or Firm—Brinks Hofer Gilson & Lione

(57) ABSTRACT

The system controller sequentially reads the interleaved units (ILVU) corresponding to all the angles to store them in the RAM as the track buffer. When the angle switching is instructed, the system controller reads the ILVU corresponding to the angle after switching, out of the angle block next to the angle block which the ILVU that was read at the moment of the switching instruction from the RAM and is a decoding object belongs to, and controls the reproduction. Further, when the angle switching is instructed, the system controller judges whether it is possible to replace the ILVU before the angle switching stored in the RAM by the ILVU after the angle switching, while maintaining a state of the reproduction image being not intermittent. When it is replaceable, the system controller reads the ILVU after the angle switching from a DVD to store it in the RAM, and thereby replaces the ILVU. Thus, the disk reproduction device achieves a quick angle switching in the multi-angle reproduction operation.

20 Claims, 16 Drawing Sheets

FIG.5

| | | | | | |
|---|---|---|---|---|---|
| CELL #1 | CELL #2 | CELL #3 | ..... | | CELL #h |

VOB

FIG.9

| ILVU STORAGE AREA CORRESPONDING TO ANGLE 1 |
|---|
| ILVU STORAGE AREA CORRESPONDING TO ANGLE 2 |
| ILVU STORAGE AREA CORRESPONDING TO ANGLE 3 |
| ILVU STORAGE AREA CORRESPONDING TO ANGLE 4 |
| ILVU STORAGE AREA CORRESPONDING TO ANGLE 5 |
| ILVU STORAGE AREA CORRESPONDING TO ANGLE 6 |
| ILVU STORAGE AREA CORRESPONDING TO ANGLE 7 |
| ILVU STORAGE AREA CORRESPONDING TO ANGLE 8 |
| ILVU STORAGE AREA CORRESPONDING TO ANGLE 9 |

FIG.11

| STORAGE AREA CORRESPONDING TO ANGLE 1 | | | |
|---|---|---|---|
| C#1 ILVU#4 | C#1 ILVU#3 | C#1 ILVU#2 | C#1 ILVU#1 |

| STORAGE AREA CORRESPONDING TO ANGLE 2 | | | |
|---|---|---|---|
| C#2 ILVU#4 | C#2 ILVU#3 | C#2 ILVU#2 | C#2 ILVU#1 |

| STORAGE AREA CORRESPONDING TO ANGLE 3 | | | |
|---|---|---|---|
| C#3 ILVU#4 | C#3 ILVU#3 | C#3 ILVU#2 | C#3 ILVU#1 |

| | RAM 26 |
|---|---|
| C#1 ILVU#1 | ANGLE INFORMATION CORRESPONDING TO C#1 ILVU#1 |
| C#1 ILVU#2 | ANGLE INFORMATION CORRESPONDING TO C#1 ILVU#2 |
| C#1 ILVU#3 | ANGLE INFORMATION CORRESPONDING TO C#1 ILVU#3 |

FIG.13(B)

| | RAM 26 |
|---|---|
| C#1 ILVU#1 | ANGLE INFORMATION CORRESPONDING TO C#1 ILVU#1 |
| C#1 ILVU#2 | ANGLE INFORMATION CORRESPONDING TO C#2 ILVU#2 |
| C#2 ILVU#3 | ANGLE INFORMATION CORRESPONDING TO C#2 ILVU#3 |

FIG.13(C)

| | RAM 26 |
|---|---|
| C#1 ILVU#1 | ANGLE INFORMATION CORRESPONDING TO C#1 ILVU#1 |
| C#1 ILVU#2 | ANGLE INFORMATION CORRESPONDING TO C#1 ILVU#2 |
| C#2 ILVU#3 | ANGLE INFORMATION CORRESPONDING TO C#2 ILVU#3 |

DISK REPRODUCTION DEVICE WITH IMPROVED MULTI-ANGLE SWITCHING

BACKGROUND OF THE INVENTION

1. Field of the Invention

This invention relates to a disk reproduction device that performs a reproduction of a digital versatile disk (DVD), etc.

2. Related Art

Recently, people's interests are focusing on the DVD as a recording medium of a disk type. The DVD has a diameter of 12 cm, and a thickness of 1.2 mm. Having the same dimensions as the compact disk (CD), the DVD has increased the recording density to reach 4.7 GB by the single layer, and 8.5 GB by the double layer.

By adopting the image data compression technique and audio data compression technique according to the MPEG2, the DVD accommodates various types of data mixed therein. Considering the case in which a movie is recorded in the DVD, normally video data and audio data are recorded. However, the storage of the caption data of plural languages other than these data, for example, will make it possible to display the caption of a language that a user selects. Also, the storage of the static images of profiles of movie directors, actors, actresses, and the like will make it possible to display these contents by the user's operation. Further, photographing a single object in plural directions or separately photographing plural objects, with video data taken in plural photographing directions (maximum, 9 angles), will achieve a multi-angle function whereby the user is able to reproduce the video data in accordance with the angle selected by the user. Also the storage of the video data and audio data corresponding to plural stories will achieve a multi-story function whereby the user is able to develop a story in accordance with the user's selection. The DVD reproduction device reproduces the DVD that holds such various data.

FIG. 15 illustrates a partial construction of a conventional DVD reproduction device, until the point data read from a DVD is inputted to the decoder. As shown in the drawing, the conventional DVD reproduction device 500 includes a data read unit 502 that reads data recorded in the DVD, a track buffer 504 that temporarily stores data outputted from the data read unit 502, and a decoder 506 that applies a decoding process to data outputted from the track buffer 504 to reproduce an image.

FIG. 16 illustrates the multi-angle function executed by the DVD reproduction device shown in FIG. 15. For example, in blocks 2–4 are recorded images by plural angles, and the user is able to select an arbitrary angle. In order to achieve this type of multi-angle function, the DVD has data by a unit of each block recorded, whereby the data of an arbitrary angle instructed by the user is selectively read, and the reproduction corresponding to the angle is executed. For example, when the user selects the angle 3 in the reproduction corresponding to the blocks 2–4 shown in FIG. 16, the data read unit 502 selectively reads only the data of the angle 3 among the blocks 2–4, as shown in FIG. 17, which are stored in the track buffer 504. Thereafter, the data of the angle 3 stored in the track buffer 504 are read out in the order stored therein, and the decoder 506 reproduces the image, etc., corresponding to the angle 3.

In the DVD-video standard, in order that a reproduced image does not become intermittent even in the course of the angle switching, the storage capacity of the track buffer 504, for example, is stipulated as 4M bits, the transfer rate between the data read unit 502 and the track buffer 504 is stipulated as 11.08M bits/sec, and the transfer rate between the track buffer 504 and the decoder 506 is 10.08M bits/sec (maximum, 8M bits/sec in transferring ILVU).

As mentioned above, the provision of the track buffer 504 with the DVD reproduction device 500 is effective to prevent the image from becoming intermittent. However, during the angle being switched, there occurs a time difference between a timing of the angle switching instructed by the user and a timing of the angle being actually switched, which gives the user a feeling that something is wrong.

As shown in FIG. 18, it is assumed that, while data of the block 2 is read from the track buffer 504 and the decoder 506 is executing the reproduction corresponding to the angle 3, data corresponding to the angle 3 in the block 3 is looked ahead and already stored in the track buffer 504. At this timing, if the user selects the angle 1 and instructs the angle switching, the data read unit 502 will change the data readout position and start to read the data corresponding to the angle 1. Therefore, the data corresponding to the angle 3 is used as to the next block, and the actual angle switching is executed after the reproduction operation corresponding to the further next block 4. In other words, from the user's instruction of the angle switching until the angle switching actually executed in correspondence to the instruction, the reproduction of data for several blocks stored in the track buffer 504 is continued in the state before the angle switching; and accordingly, it takes some time until the start of the reproduction after the instructed angle switching.

The present invention has been made in view of the above problem, and it is an object of the invention to provide a disk reproduction device that quickly performs the angle switching in the multi-angle reproduction operation.

In order to solve the foregoing object, in the disk reproduction device of this invention, a data storage means stores the compression data corresponding to each of different plural angles of the image with one reproduction timing, and when the angle being a reproduction object is switched, a data reproduction means reads the compression data corresponding to an angle after switching stored in the data storage means to reproduce the image. Therefore, when the angle switching is instructed, the disk reproduction device does not read the compression data of the angle after switching that was newly stored in the data storage means from then on, but uses the compression data of the angle after switching that has already been stored in the data storage means, and thereby executes a reproduction operation corresponding to the angle after switching, thus implementing a swift angle switching in the multi-angle reproduction operation.

Preferably, the foregoing data storage means stores the compression data corresponding to each of the different plural angles in a unit of an interleaved unit, and the data reproduction means switches the compression data being a readout object in a unit of the interleaved unit. To switch the compression data being a readout object in a unit of the interleaved unit enables the seamless reproduction that does not make a reproduction image intermittent, and also enables a swift and natural angle switching.

Also, it is preferable to store the compression data corresponding to each of the different plural angles in the data storage means, only when a data transfer rate at which the compression data read from the disk type recording medium is stored in the data storage means is greater than a value obtained by multiplying the number of the plural angles and a readout bit rate at which the data is read from the data storage means. When the speed to read the compression data from the disk type recording medium is lower, or on the contrary, when the speed to read the compression data from the data storage means is higher, or when the number of the angles is multiple, it can be avoided that the writing of the compression data into the data storage means is not in time to become under flow, whereby a natural reproduction image without intermission can be achieved. Further, in the disk reproduction device of the invention, after the data storage means selectively stores the compression data corresponding to each of the different plural angles of the image with one reproduction timing, when the angle being a reproduction object is switched, a re-read instruction means instructs the signal processing means to read the compression data corresponding to an angle after switching, of which reproduction timing is the same as that of the compression data corresponding to the angle before switching already read and stored, and a data replacement means replaces the compression data read in accordance with the instruction. Therefore, when the angle switching is instructed, the disk reproduction device does not read the compression data of the angle after switching that was newly stored in the data storage means from then on, but newly reads the compression data of the angle before switching already stored in the data storage means and the compression data of the angle after switching, of which reproduction timing is the same, and thereby executes a reproduction operation corresponding to the angle after switching, thus implementing a swift angle switching in the multi-angle reproduction operation.

Preferably, the foregoing data storage means stores the compression data corresponding to each of the different plural angles in a unit of an interleaved unit, and the data reproduction means switches the compression data being a readout object in a unit of the interleaved unit. To switch the compression data being a readout object in a unit of the interleaved unit enables the seamless reproduction that does not make a reproduction image intermittent, and also enables a swift and natural angle switching.

Also, it is preferable, when storing the compression data corresponding to any one of the angles in the data storage means, to generate angle information necessary for reading the compression data corresponding to the other angles with the same reproduction timing, and to store the angle information in association with the compression data in the data storage means.

Also, preferably the re-read instruction means designates a read position of the compression data corresponding to the angle after switching, so that a replacement of the compression data corresponding to the angle before switching with the compression data corresponding to the angle after switching does not make a reproduction image intermittent. Depending on the quantity of the compression data being a reproduction object at the moment of the angle switching being instructed, or the quantity of the compression data being next read, the replacement of the compression data cannot be made in time occasionally, and in consequence, the reproduction image becomes intermittent. By setting the read position of the compression data to avoid such inconveniences, it becomes possible to prevent unnatural reproduction images from being displayed, and to reduce an unpleasant feeling and a feeling that something is wrong when the user views the reproduction image.

BRIEF DESCRIPTION OF THE DRAWINGS

FIG. 5 is a chart illustrating a data structure of a video object (VOB);

FIG. 9 is a chart illustrating an example of the storage area in the RAM;

FIG. 11 is a chart illustrating an example of the storage area in the RAM with the ILVU stored;

FIG. 13 is a chart illustrating an example of replacement and transition of the ILVU;

DESCRIPTION OF THE PREFERRED EMBODIMENTS

1. First Embodiment

A DVD reproduction device of a first embodiment according to the invention will be described with reference to the accompanying drawings.

(1) Contents of the Data Recorded in a DVD

Figure 1:
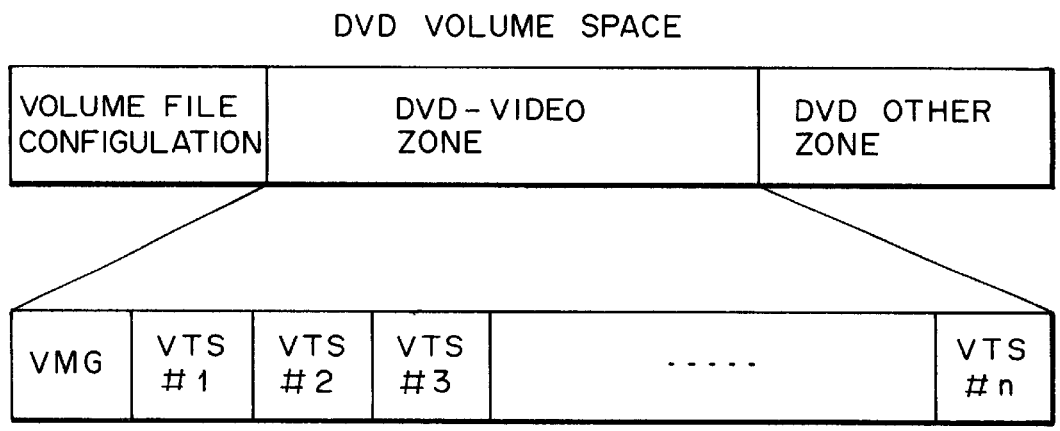
FIG. 1 is a chart illustrating a structure of the DVD volume space.

The detail of the data recorded in a DVD as a disk type recording medium will be explained first. FIG. 1 illustrates a structure of the DVD volume space. As shown in the drawing, the volume space of the DVD contains, from the inner periphery toward the outer periphery, the volume/file configuration, DVD-Video zone, and DVD other zone. Of these, the DVD-Video zone contains various data required for the reproduction operation. The DVD-Video zone is configured with a video manager (VMG) and more than one video title sets (VTS) corresponding to each title.

Figure 2:
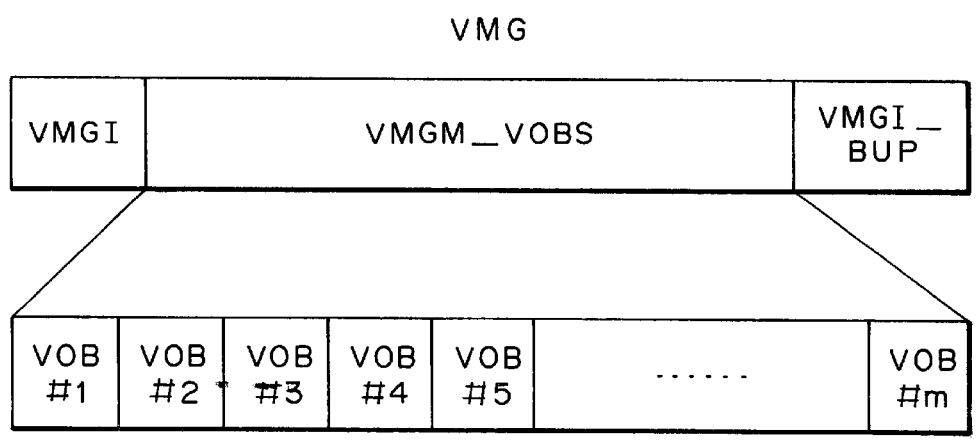
FIG. 2 is a chart illustrating a data structure of a video manager (VMG)

FIG. 2 illustrates the data structure of the VMG. As shown in FIG. 2, the VMG is configured with video manager information (VMGI), a video object set for VMG menu (VMGM_VOBS), and a file for the VMGI backup (VMGI_BUP).

The VMGI includes information relating to the VTS (for example, the number of the VTS, identifying information of each VTS, locations of each VTS stored in the DVD, etc.), the display order of the titles displayed on the title menu, more-than-one program chain information (PGCI), and a disk ID (DVD_ID) for identifying the DVD, etc. The VMGM_VOBS is configured with more than one video objects (VOB). The VOB includes the video reproducing data used in the reproduction of the title menu screen for selecting the titles.

Figure 3:
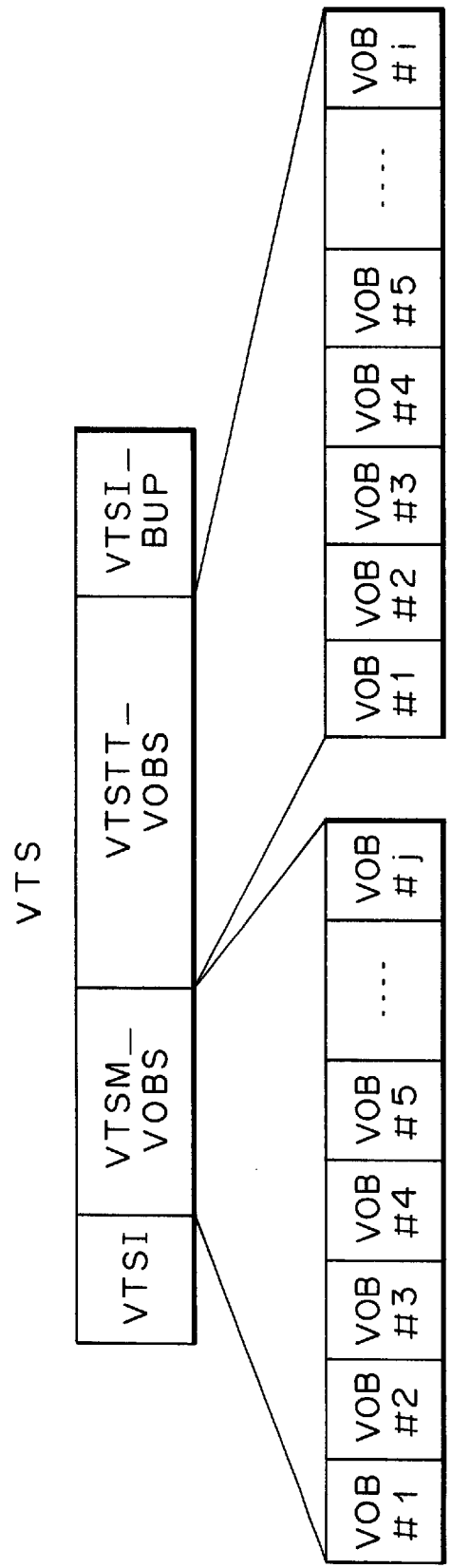
FIG. 3 is a chart illustrating a data structure of video title sets (VTS)

FIG. 3 illustrates the data structure of the VTS. As shown in FIG. 3, the VTS is configured with a video title set information (VTSI), a video object set for VTS menu (VTSM_VOBS), a video object set for VTS title (VTSTT_VOBS), and a file for the VTSI backup (VTSI_BUP).

The VTSI includes information relating to the titles such as the VTS_ID for identifying the titles, and more-than-one PGCI, etc. The VTSM_VOBS, and the VTSTT_VOBS are configured with more than one video objects (VOB). The VOB includes the reproduction data for the video and audio data.

The program chain (PGC) is a logical processing unit in the reproduction operation, which is configured with the program chain information (PGCI) and one or plural VOB. For example, one piece of the PGCI in the VMGI and one or plural VOB in the VMGM_VOBS constitute the PGC. Also, one piece of the PGCI in the VTSI and one or plural VOB in the VTSM_VOBS constitute the PGC. Or, one piece of the PGCI in the VTSI and one or plural VOB in the VTSTT_VOBS constitute the PGC.

The PGC configured with the PGCI in the VMGI and one or plural VOB in the VMGM_VOBS displays a title menu, and when any item in this title menu is selected, it is to specify the data area to be reproduced in correspondence with the selected item. And, the PGC configured with the PGCI in the VTSI and one or plural VOB in the VTSTT_VOBS contains various data required for reproducing the contents corresponding to an item selected from among the title menu.

Figure 4:
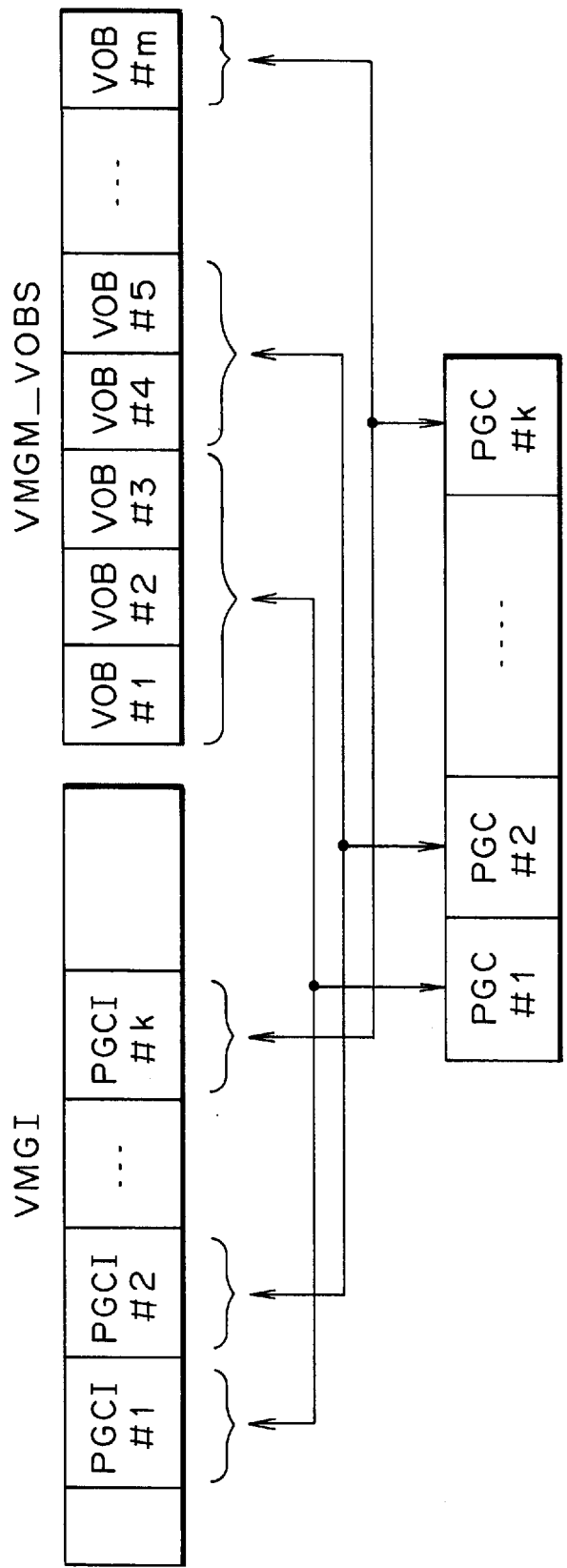
FIG. 4 is a chart illustrating a structure of a program chain (PGC) configured with the program chain information (PGCI) in the video manager information (VMGI) and video objects (VOB) in a video object set for VTS menu (VMGM$_{13}$ VOBS)

FIG. 4 illustrates an example of the structure of the PGC, which is configured with the PGCI in the VMGI and one or plural VOB in the VMGM_VOBS. In FIG. 4, the PGC#1, for example, is composed of the PGCI#1 in the VMGI and the VOB#1–#3 in the VMGM_VOBS. Also, the PGC#2 is composed of the PGCI#2 in the VMGI and the VOB#4, #5 in the VMGM_VOBS. These PGC are specified by the PGC number. The PGC number is determined by the storage order of the PGCI in the VMGI. For example, in the PGC shown in FIG. 4, since the PGC is stored in the order of PGCI#1, PGCI#2, the PGC number of PGC#1 including PGCI#1 is "1", and the PGC number of PGC#2 including PGCI#2 is "2".

Further, the PGC configured with the PGCI in the VTSI and one or plural VOB in the VTSM_VOBS, or the PGC configured with the PGCI in the VTSI and one or plural VOB in the VTSTT_VOBS possesses the same structure as the PGC shown in FIG. 4. The PGCI contains the reproduction order of the corresponding plural VOB and information regarding the PGC by which the reproduction is executed next.

Figure 5:
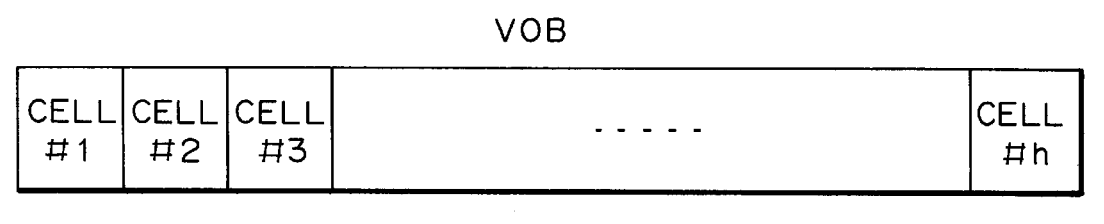

FIG. 5 illustrates the data structure of the VOB contained in the foregoing VMGM_VOBS, VTSM_VOBS, and VTSTT_VOBS. As shown in FIG. 5, the VOB is composed of plural cells.

In the multi-angle function, when photographing plural objects individually, one cell includes video data of one angle in a specific reproduction time zone. Each of the cells is divided into interleaved units (ILVU) of a specific size by the DVD-video standard. Further, the start address of each ILVU can be determined by the DSI described later. Also, the angles each are stipulated by the angle number.

Figure 6:
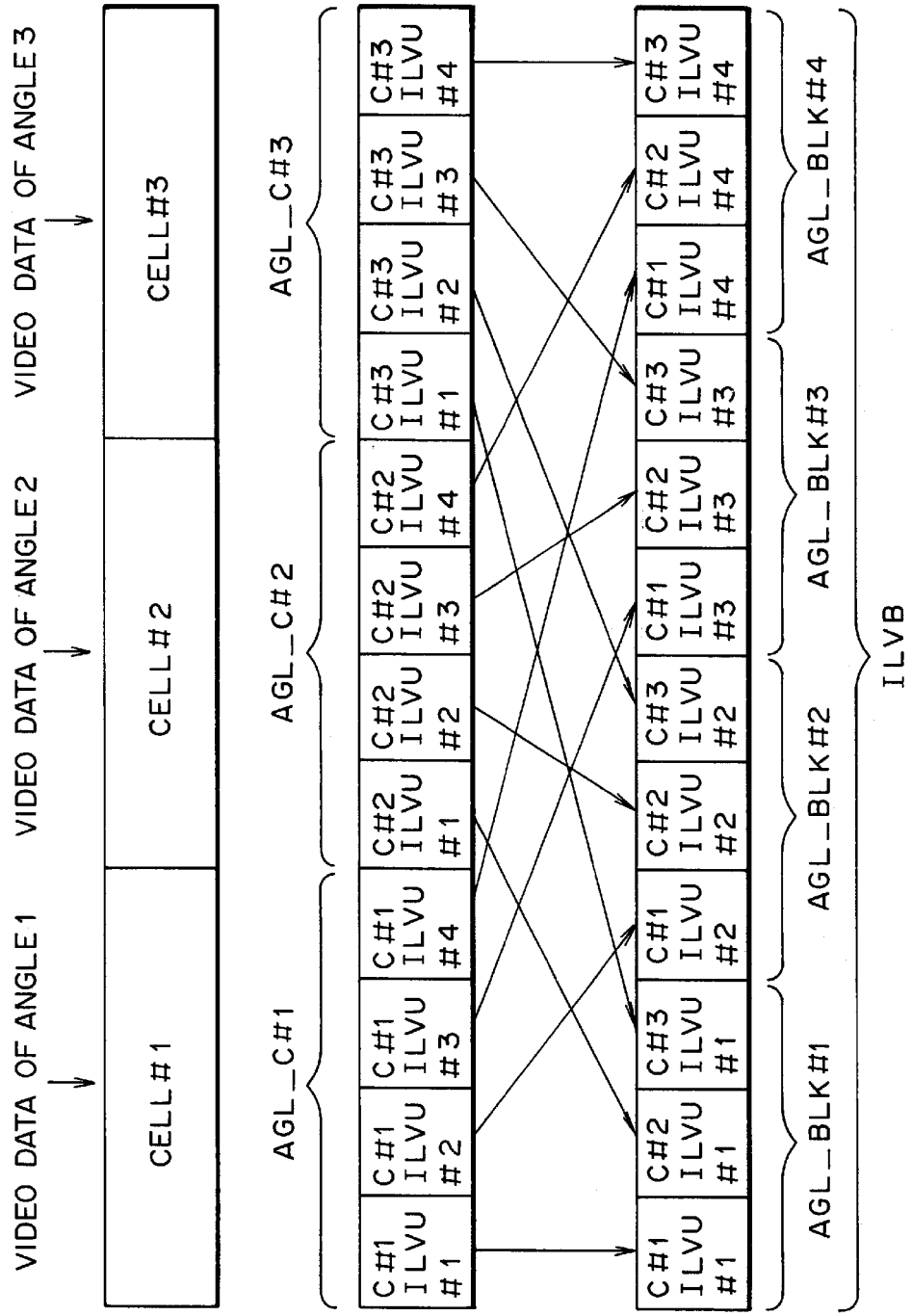
FIG. 6 is a chart illustrating the correspondence between a cell and interleaved units (ILVU, ILVB)

FIG. 6 illustrates the correspondence between the cell and the ILVU, ILVB, in which each cell stores the video data of three angles (angle 1–angle 3). As described above, since one cell includes the video data of one angle in a specific reproduction time zone, the video data of three angles in a specific reproduction time zone are included by three cells. That is, the video data of the angle 1 in a specific reproduction time zone is included by the cell#1, the video data of the angle 2 by the cell#2, and the video data of the angle 3 by the cell#3.

Each of the cells is divided into the interleaved units (ILVU). For example, when one cell is divided into four ILVU, as shown in FIG. 6, the cell#1 including the video data of the angle 1 is divided into four, C#1ILVU#1, C#1ILVU#2, C#1ILVU#3, and C#1ILVU#4 in the order of the reproduction time zone, and these C#1ILVU#1 and so forth constitute the angle cell (AGL_C#1). In the same manner, the cell#2 including the video data of the angle 2 is divided into four, C#2ILVU#1, C#2ILVU#2, C#2ILVU#3, and C#2ILVU#4 in the order of the reproduction time zone, and these C#2ILVU#1 and so forth constitute the angle cell (AGL_C#2). Further, the cell#3 including the video data of the angle 3 is divided into four, C#3ILVU#1, C#3ILVU#2, C#3ILVU#3, and C#3ILVU#4 in the order of the reproduction time zone, and these C#3ILVU#1 and so forth constitute the angle cell (AGL_C#3). In this case, the C#1ILVU#1, C#2ILVU#1, C#3ILVU#1 belong to the same reproduction time zone, and constitute the angle block (AGL_BLK#1). Similarly, the C#1ILVU#2, C#2ILVU#2, C#3ILVU#2 belong to the same reproduction time zone to constitute the angle block (AGL_BLK#2). Also, the C#1ILVU#3, C#2ILVU#3, C#3ILVU#3 belong to the same reproduction time zone to constitute the angle block (AGL_BLK#3), and the C#1ILVU#4, C#2ILVU#4, C#3ILVU#4 belong to the same reproduction time zone to constitute the angle block (AGL_BLK#4). Each ILVU includes more than one video object units (VOBU) described later.

The ILVB is composed of plural ILVU. As shown in FIG. 6, for example, the ILVB is composed of the C#1ILVU#1, C#2ILVU#1, C#3ILVU#1 belonging to the AGL_BLk#1, the C#1ILVU#2, C#2ILVU#2, C#3ILVU#2 belonging to the AGL_BLK#2, the C#1ILVU#3, C#2ILVU#3, C#3ILVU#3 belonging to the AGL_BLK#3, and the C#1ILVU#4, C#2ILVU#4, C#3ILVU#4 belonging to the AGL_BLK#4.

In the multi-angle reproduction operation, the decoding processing is applied to the ILVU, one by one, corresponding to the angle selected among the angle blocks constituting the ILVB. For example, in case of reproducing the video data of the angle 1, the decoding is made in the order of the C#1ILVU#1, C#1ILVU#2, C#1ILVU#3, C#1ILVU#4. When switching into the angle 2 during the reproduction of the angle 1, for example, after applying the decoding to the C#1ILVU#1, the C#2ILVU#2 is decoded.

Figure 7:
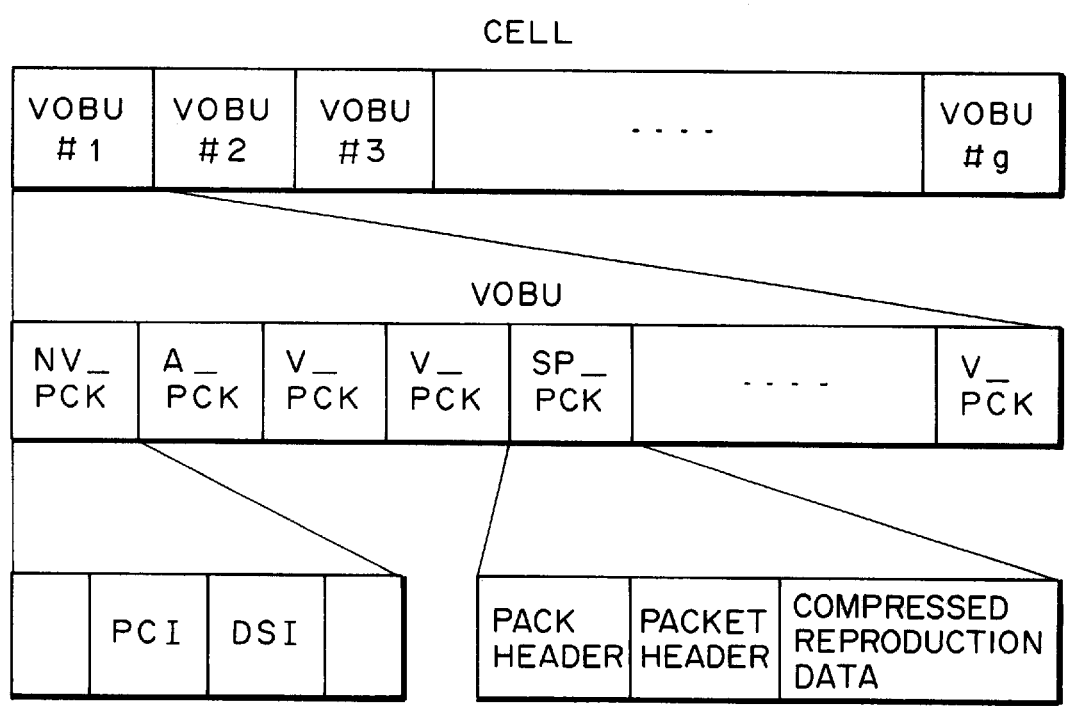
FIG. 7 is a chart illustrating a data structure of the cell.

FIG. 7 illustrates the data structure of the cell. As shown in FIG. 7, each cell is composed of one or more video object units (VOBU). Each VOBU is composed of one navigation pack (NV_PCK), and at least one of the video pack (V_PCK), sub-picture pack (SP_PCK), and audio pack (A_PCK). The navigation pack (NV_PCK) includes reproduction control information (PCI), and data search information (DSI). The data quantity of the VOBU, the reproduction time and the position of the VOBU to be reproduced next, etc., are set in the PCI and the DSI. Further, the DSI contains seamless reproduction angle information (SML_AGLI). The address and data quantity (SML_AGL_Cn_DSTA) of the ILVU contained in each angle are set in the SML_AGLI.

The V_PCK, SP_PCK, and A_PCK include the pack header and the packet header containing the information of the type (animation, sub-picture, audio), etc., of the reproduction data, and the video data, sub-picture data, and audio data having the data compression applied (compressed reproduction data).

(2) Total Configuration of a DVD Reproduction Device

Figure 8:
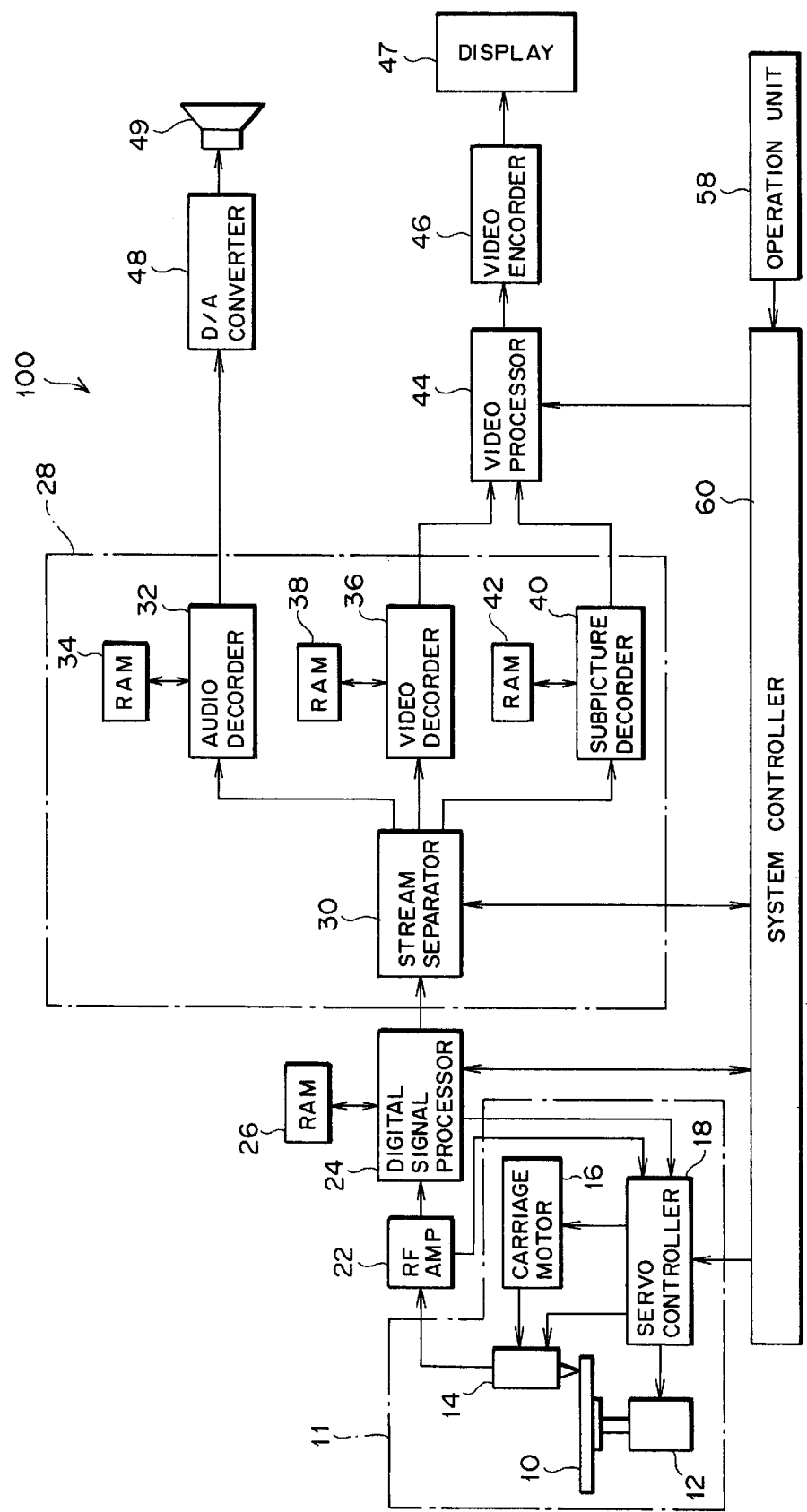
FIG. 8 is a chart illustrating the total configuration of a DVD reproduction device relating to tpreferred embodiments of the present invention.

FIG. 8 illustrates the total configuration of a DVD reproduction device according to the first embodiment. A DVD reproduction device 100 shown in the drawing includes a data read unit 11 that reads data (signals) recorded in a DVD 10, an RF amplifier 22 that amplifies the read signals and outputs the image and audio signals, a digital signal processor 24, a RAM 26, a decoding unit 28, a video processor 44, a video encoder 46, a display 47, a digital-to-analog (D/A) converter 48, a speaker 49, an operation unit 58 whereby a user inputs various instructions of operation, and a system controller 60 that controls all of the units of the DVD reproduction device 100.

The data read unit 11 includes a spindle motor 12, an optical pickup 14, a carriage motor 16, and a servo controller 18. The spindle motor 12 rotates the DVD 10 at a constant line speed. The optical pickup 14 incorporates a semiconductor laser and a photo-diode, etc., to detect data recorded in the DVD 10. The carriage motor 16 carries the optical pickup 14 in the radial direction of the DVD 10.

The servo controller 18 drives the spindle motor 12 and the carriage motor 16, and moves an objective lens (not illustrated) incorporated in the optical pickup 14 to thereby move the focal position of the semiconductor laser in the vertical and horizontal directions to the record plane of the DVD 10. The servo controller 18 executes various servo controls (focusing servo, tracking servo, rotation servo) required for the data reading from the DVD 10.

Further, in the multi-angle reproduction operation, the servo controller 18 executes, in accordance with the instruction by the system controller 60, various servo controls so as to read out all the ILVU contained in the ILVB to be processed in the order of the reproduction time zone from the DVD 10.

The RF amplifier 22 amplifies electric signals outputted from the photo diode incorporated in the optical pickup 14, and also has a function to output a track jump detection signal, when there occurs a track jump due to big vibrations or shocks imposed on the DVD reproduction device 100.

The digital signal processor 24 converts the signals outputted from the RF amplifier 22 into digital data, thereafter executes the signal decoding (8–16 decoding) and the error correction in accordance with the data format of the DVD 10, outputs the VMGI and the VTSI to the system controller 60, and stores the cells in the RAM 26. The digital signal processor 24 also extracts the VOBU constituting the cell stored in the RAM 26 in accordance with an instruction by the system controller 60, and outputs it to the decoding unit 28.

In the multi-angle reproduction operation, the digital signal processor 24 stores all the ILVU contained in the ILVB to be processed sequentially in the RAM 26. The RAM 26 is a track buffer, which, as shown in FIG. 9, is provided with storage areas for each of the angles, and stores each of the ILVU contained in the ILVB in the storage area of the corresponding angle. The digital signal processor 24 reads, in accordance with an instruction by the system controller 60, the ILVU corresponding to an angle selected out of the angle blocks constituting the ILVB to be processed, from the RAM 26 one by one in the order of the reproduction time zone, outputs the VOBU constituting the ILVU to the decoding unit 28, and deletes from the RAM 26 the other ILVU belonging to the same reproduction time zone as that of the ILVU read from the RAM 26, namely, the other ILVU belonging to the identical angle block.

When the user instructs an angle switching, the digital signal processor 24, in accordance with an instruction by the system controller 60, extracts, after the ILVU that was read from the RAM 26 at the moment of the instruction and is the decoding object, the ILVU corresponding to the angle after the angle switching out of the angle block next to the angle block that the above ILVU read from the RAM 26 belongs to, reads it from the RAM 26, outputs the VOBU constituting the ILVU to the decoding unit 28, and deletes from the RAM 26 the other ILVU belonging to the same angle block as that of the ILVU read from the RAM 26.

The decoding unit 28 includes a buffer RAM 34, 38, 42, a stream separator 30, an audio decoder 32, a video decoder 36, and a sub-picture decoder 40.

The stream separator 30 analyzes pack headers constituting the VOBU outputted from the digital signal processor 24 in accordance with an instruction by the system controller 60, and thereby separates them into the audio pack (A_PCK), video pack (V_PCK), sub-picture pack (SP_PCK), and navigation pack (NV_PCK). The audio pack (A_PCK) separated by the stream separator 30 is outputted to the audio decoder 32, the video pack (V_PCK) is outputted to the video decoder 36, the sub-picture pack (SP_PCK) is outputted to the sub-picture decoder 40, and the navigation pack (NV_PCK) is transferred to the system controller 60.

The audio decoder 32 executes a specific decoding to the audio pack outputted from the stream separator 30, and outputs audio data. The video decoder 36 executes a specific decoding to the video pack outputted from the stream separator 30, and outputs video data. The sub-picture decoder 40 executes a specific decoding to the sub-picture pack outputted from the stream separator 30, and outputs sub-picture data.

The video processor 44 synthesizes, in accordance with an instruction by the system controller 60, the video data outputted from the video decoder 36 with the sub-picture data outputted from the sub-picture decoder 40 to generate image data, and outputs it to the video encoder 46. The video encoder 46 converts the image data outputted from the video processor 44 into an image signal for display. The image signal is delivered to the display 47 to present an image.

The D/A converter 48 converts the audio data outputted from the audio decoder 32 into an analog audio signal. The analog audio signal is delivered to the speaker 49 to reproduce an audio sound.

The operation unit 58 is provided with a reproduction key for giving a reproduction instruction for a title, an angle switching key for giving an angle switching instruction in the multi-angle reproduction operation, a cursor key to move the pointer up and down, right and left, a setting key to define a certain item at the cursor position on the display screen, and other various operation keys, and outputs a signal corresponding to the operation state of the key to the system controller 60.

The system controller 60 controls all the functional blocks by issuing various instructions to the servo controller 18, and by issuing image generation instructions that comply with the instruction of the user to the video processor 44. Further, the system controller 60 receives the VMGI, VTSI contained in the data outputted from the digital signal processor 24 and the NV—PCK outputted from the stream separator 30, and executes the navigation commands contained in this information, whereby the system controller 60 executes various controls necessary for the reproduction operation to the stream separator 30, etc.

Further, in the multi-angle reproduction operation, the system controller 60 issues various servo instructions to the servo controller 18 to read out all the ILVU contained in the ILVB being a processing object from the DVD 10 in the order of the reproduction time zone. Also, the system controller 60 instructs the digital signal processor 24 to read out the ILVU corresponding to the angle selected out of the angle blocks constituting the ILVB of the processing object, from the RAM 26 one by one in the order of the reproduction time zone. Further, when the user instructs the angle switching by pressing the key on the operation unit 58, the system controller 60 instructs the digital signal processor 24 to read out the ILVU corresponding to the angle after switching, out of the angle block next to the angle block to which belongs the ILVU that was read at that moment of the switching instruction from the RAM 26 and is the decoding object.

The foregoing data read unit 11, RF amplifier 22, digital signal processor 24, and system controller 60 correspond to the signal processing means; the RAM 26 corresponds to the data storage means; and the decoding unit 28, video processor 44, video encoder 46, and system controller 60 correspond to the reproduction means.

(3) Operation of the DVD Reproduction Device

Figure 10:
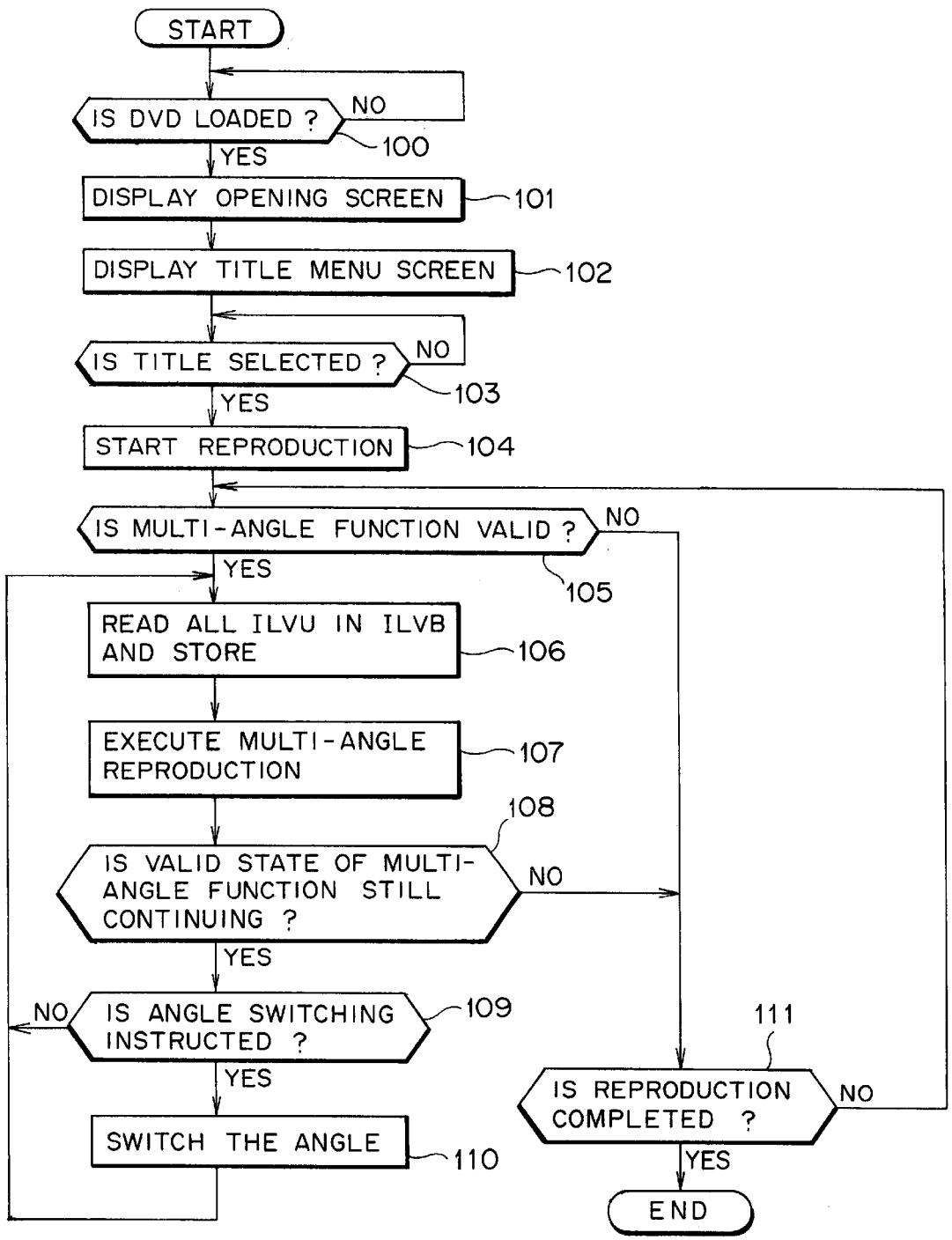
FIG. 10 is a flow chart illustrating the processing procedure of the multi-angle reproduction operation in one embodiment of the DVD reproduction device.

Next, the operation of the DVD reproduction device 100 will be explained. FIG. 10 illustrates the processing procedure of the multi-angle reproduction operation in the DVD reproduction device 10. The system controller 60 judges whether a user loads the DVD 10 into the DVD reproduction device or not (step 100). When the DVD 10 is loaded, next the system controller 60 displays the opening display screen for a certain period of time (step 101), and then displays the title menu screen (step 102). Based on the program chain information (PGCI) contained in the video manager (VMG), for example, the video object (VOB) corresponding to the opening screen is read, and the specific opening display screen is presented on the display unit. Since the item to be reproduced on the title menu displayed next to the opening screen can be specified on the basis of the program chain information unit table (PGCI_UT) in the VMGI, subsequently the display operation of the title menu is started.

Next, the system controller 60 judges whether a title is selected or not (step 103). When the user operates the cursor key on the operation unit 58, points the cursor to a title displayed on the title menu, and presses the setting key to determine the selection of the title, the system controller 60 starts the reproduction of the selected title (step 104).

Next, the system controller 60 judges whether the ILVB becomes the processing object and the multi-angle function becomes valid or not (step 105). If the multi-angle function becomes valid, the system controller 60 controls to read all the ILVU contained in the ILVB of the processing object subsequently from the DVD 10 in the order of the reproduction time zone, and to store them in the RAM 26 (step 106). For example, if the ILVB shown in FIG. 6 becomes the processing object, as shown in FIG. 11, C#1ILVU#1, C#1ILVU#2, C#1ILVU#3, and C#1ILVU#4 are stored in the storage area corresponding to the angle 1 in the RAM 26. Similarly, C#2ILVU#1, C#2ILVU#2, C#2ILVU#3, and C#2ILVU#4 are stored in the storage area corresponding to the angle 2, and C#3ILVU#1, C#3ILVU#2, C#3ILVU#3, and C#3ILVU#4 are stored in the storage area corresponding to the angle 3. Here, since each ILVU is set in the variable rate in practice, each has different data quantity, and in addition, the write and readout of the data (ILVU) are carried out in parallel to the RAM 26. Therefore, the ILVU are not necessarily stored in the unit of the ILVB, as shown in FIG. 11.

Next, the system controller 60 reads the ILVU corresponding to the angle selected at that time out of the angle blocks constituting the ILVB of the processing object, from the RAM 26 one by one in the order of the reproduction time zone to transfer them to the decoding unit 28, and executes the multi-angle operation (step 107). Specifically, the system controller 60 issues an instruction to the digital signal processor 24 so as to read the ILVU corresponding to the initially set angle, for example, out of the angle blocks constituting the ILVB of the processing object, from the RAM 26 one by one in the order of the reproduction time zone. In response to this instruction, the digital signal processor 24 reads out the corresponding ILVU from the RAM 26 to output the VOBU constituting the ILVU to the decoding unit 28, and deletes the other ILVU belonging to the same reproduction time zone as that of this ILVU from the RAM 26. The decoding unit 28 then decodes the inputted VOBU. Until the angel switching is instructed, this operation is continued.

When the multi-angle operation is started, the system controller 60 analyzes the DSI of the NV_PCK located at the head of the ILVU that has become an object of the decoding at step 107, and thereby judges whether the valid state of the multi-angle function is continued or not (step 108).

If the multi-angle function continues the valid state, the system controller 60 will judge whether the user has pressed the angle switching key provided on the operation unit 58 to thereby instruct the angle switching (step 109). If the angle switching is instructed, the system controller 60 will switch the angle (step 110).

Specifically, when the user presses the angle switching key provided on the operation unit 58 to instruct an angle switching, the system controller 60 instructs the digital signal processor 24 to read the ILVU corresponding to the angle after the angle switching, out of the angle block next to the angle block to which belongs the ILVU that was read at that moment of the switching instruction from the RAM 26 and is the decoding object. In the DVD reproduction device 100 of this embodiment, since all the ILVU contained in the angle blocks are stored in the RAM 26 as the track buffer, any ILVU contained in the next angle block is ready to be selected. In accordance with this instruction by the system controller 60, the digital signal processor 24 reads the ILVU that was read at that moment of the instruction from the RAM 26 and is the decoding object, subsequently reads the ILVU corresponding to the angle after switching, outputs the VOBU constituting the ILVU to the decoding unit 28, and deletes from the RAM 26 the other ILVU belonging to the identical angle block to that of the ILVU read from the RAM 26. The decoding unit 28 then decodes the inputted VOBU.

Suppose that, as shown in FIG. 11, the RAM 26 has the ILVU stored. First, when an image corresponding to the angle 1, for example, is reproduced in the multi-angle reproduction operation, the digital signal processor 24, in accordance with an instruction by the system controller 60, reads C#1ILVU#1 corresponding to the angle 1 from the RAM 26, out of the angle block (AGL_BLK#1) constituting ILVB of the processing object, outputs the VOBU constituting this C#1ILVU#1 to the decoding unit 28, and deletes from the RAM 26 the other ILVU (C#2ILVU#1, C#3ILVU#1) belonging to the same angle block as C#1ILVU#1. The decoding unit 28 decodes the inputted VOBU.

While C#1ILVU#1 is read from the RAM 26 and the decoding is executed, if switching from the angle 1 into the angle 2 is instructed, in response to the instruction by the system controller 60, the digital signal processor 24 will read, subsequently to C#1ILVU#1, C#2ILVU#2 corresponding to the angle 2 among the ILVU (C#1ILVU#1, C#2ILVU#2, C#3ILVU#3) belonging to the angle block (AGL_BLK#2) next to the angleblock (AGL_BLK#1) to which C#1ILVU#1 belongs, outputs the VOBU constituting this C#2ILVU#2 to the decoding unit 28, and deletes the other ILVU (C#1ILVU#2, C#3ILVU#2) belonging to the same angle block as C#2ILVU#2. The decoding unit 28 decodes the inputted VOBU. The operation like this switches the angle 1 into the angle 2.

Thereafter, the system controller 60 repeats the operation after the step 106 that sequentially reads all the ILVU contained in the ILVB of the processing object, from the DVD 10 in the order of the reproduction time zone, and stores them in the RAM 26.

If the angle switching is not instructed (in case of the negative judgment at step 109), the system controller 60 will repeat the operation after the step 106 that sequentially reads all the ILVU contained in the ILVB of the processing object, from the DVD 10 in the order of the reproduction time zone, and stores them in the RAM 26.

Further, if the multi-angle reproduction function is not valid (in case of the negative judgment at step 105), or if the valid state of the multi-angle reproduction function is not continued (in case of the negative judgment at step 108), the system controller 60 will judge whether the reproduction of the title is completed or not (step 111). If the reproduction of the title is completed, the system controller 60 will finish a series of the reproduction operation. Further, if the reproduction of the title is not completed, again it will be judged whether the multi-angle function is made valid or not (step 105).

In this manner, in the DVD reproduction device 100 of this embodiment, the ILVU corresponding to all the angles are read sequentially from the DVD 10 to be stored in the RAM 26. In other words, the DVD reproduction device 100 of this embodiment, not like the conventional DVD device 500 shown in FIG. 15, in which only the ILVU corresponding to the angle of a reproduction object is read and stored, and the ILVU after the angle switching are not read and stored until the angle switching is instructed, is able to store the ILVU after the angle switching in advance.

Thus, in the conventional DVD reproduction device, when the angle switching is instructed, all the ILVU before the angle switching that have already been stored in the track buffer at that moment of the switching instruction are decoded, and thereafter the ILVU after the angle switching are decoded. In contrast to this, in the DVD reproduction device 100 of this embodiment, the decoding of the ILVU after the angle switching can be executed immediately after the ILVU before the angle switching, which are the decoding object when the angle switching is instructed; and therefore, a quick angle switching becomes possible in response to the user's instruction.

Figure 15:
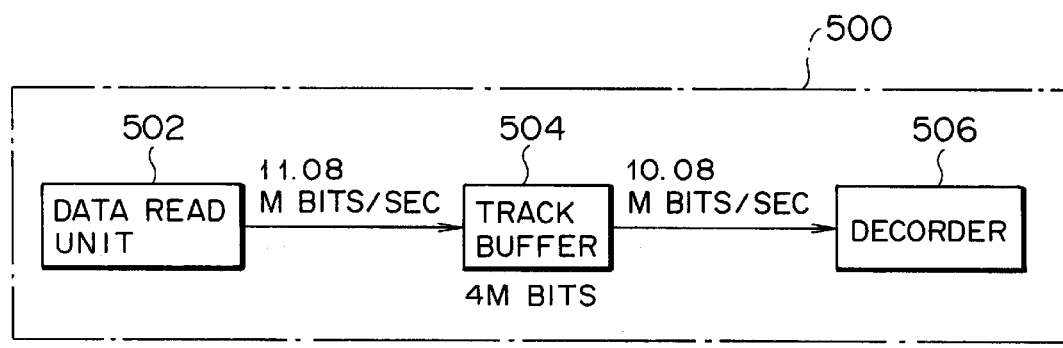
FIG. 15 is a chart illustrating the outline of the transfer rate until data read from a DVD is inputted to a decoder in a conventional DVD reproduction device.
Figure 16:
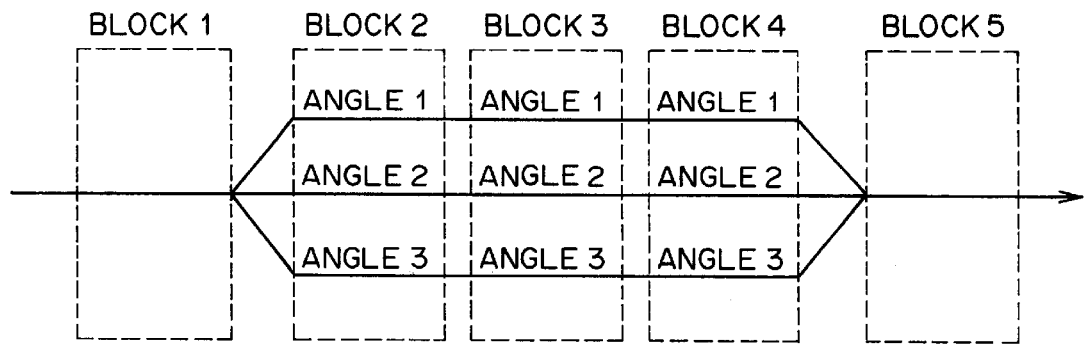
FIG. 16 is a chart explaining the multi-angle function that the disk reproduction device shown in FIG. 15 performs.
Figure 17:
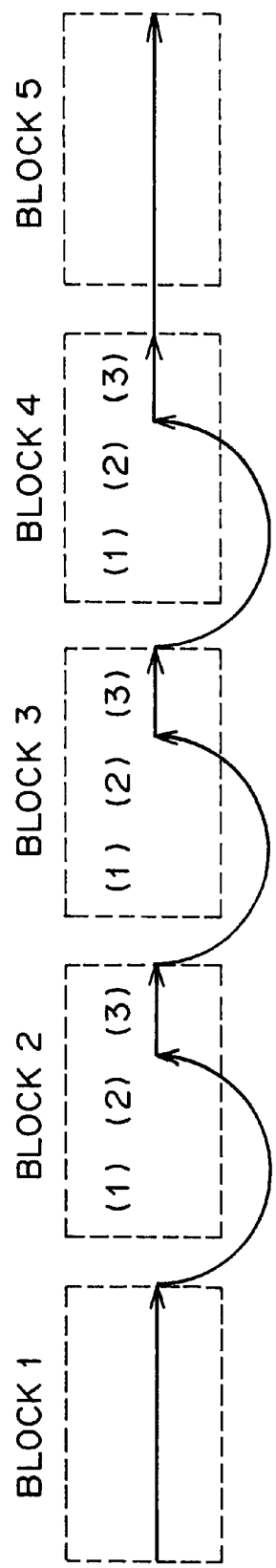
FIG. 17 is a chart illustrating a state of data read corresponding to the multi-angle function.
Figure 18:
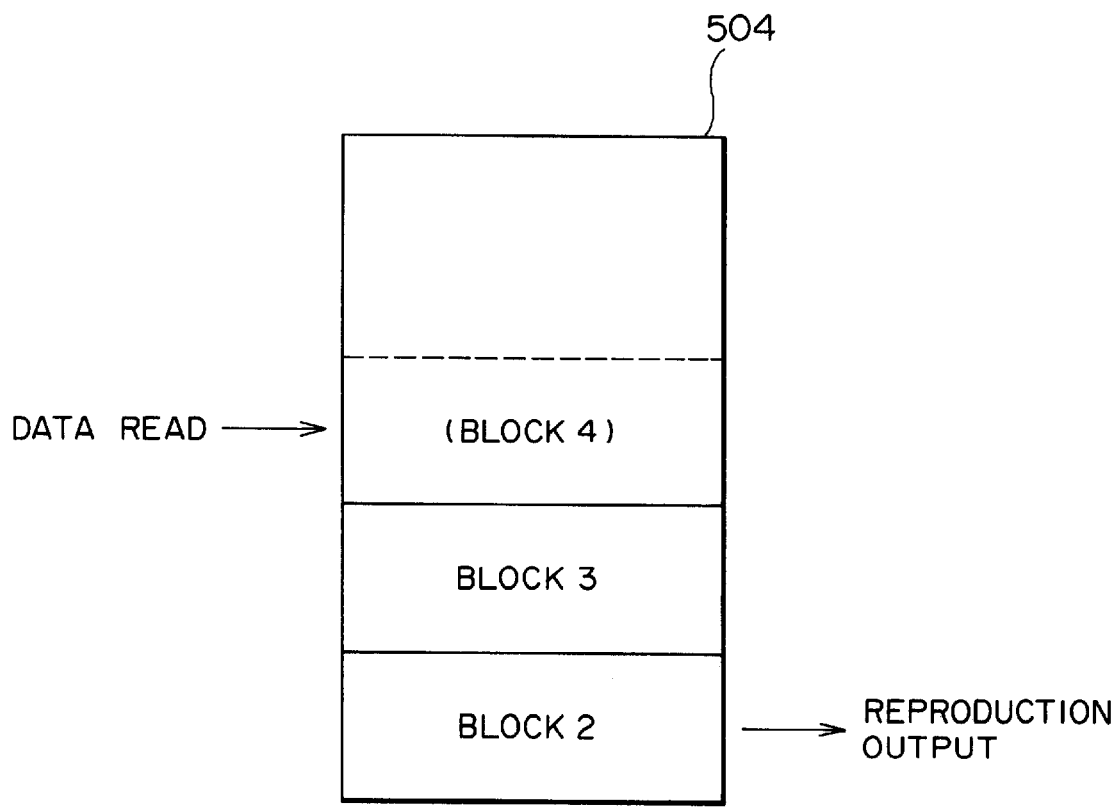
FIG. 18 is a chart illustrating a stored state of data of the block in the track buffer.

In order to implement the DVD device of this embodiment, it is preferable to set the transfer rate between the data read unit 11 and the RAM 26 to more than 7 times (77.56M bits/sec) the transfer rate (11.08M bits/sec) between the data read unit 502 and the track buffer 504 of the conventional DVD reproduction device 500 shown in FIG. 15. Generally, the maximum readout bit rate per one angle is 8M bits/sec, and accordingly to employ the data read unit 11 with the transfer rate of more than 7 times will make it possible to store the ILVU of all the angles in the RAM 26 in such a manner that the reproduction images of the angles do not become intermittent. Further, as for the storage capacity of the RAM 26, considering that data of 9 angles is read from the data read unit 11 at the maximum rate, it is preferable to secure 4M bits per angle, or 36M bits (4M bits×9) as a whole.

The invention is not limited to this embodiment, and various modifications and changes are possible within the scope and spirit of the invention. In the foregoing embodiment, in order not to make the image of each angle intermittent, it is recommended to set the transfer rate of the data read unit 11 at least 7 times the conventional transfer rate, and to secure 36M bits as the storage capacity of the RAM 26. However, since the data readout from the RAM 26 is not necessarily executed at the maximum rate, the data read unit 11 and the RAM 26 may be adopted which are provided with the following specifications below the above mentioned. For example, when the data read unit 11 with the transfer rate set double the conventional is employed, if the number of the angles to be switched is 5, and the actual readout bit rate of each angle is less than 4M bits/sec, the ILVU of all the angels can be stored in the RAM 26 in a state that the reproduction image of each angle is not intermittent. Further, in the reproduction zone where the multi-angle function is not used, or even when the multi-angle function is used, in case there is a surplus storage area in the RAM 26 in relation to the number of the angles, etc., it is recommended that the system controller 60 determines the presence of the surplus storage area, and the surplus storage area is employed as a large capacity track buffer for absorbing vibrations. Specifically, big vibrations can be imposed very often on the on-vehicle disk reproduction device; and accordingly, if the large storage capacity of the RAM 26 is utilized as the track buffer for absorbing vibrations when not used for the multi-angle function, it will prevent an intermittent image or sound that can be created by the vibrations resulting from a vehicle traveling on rough roads, etc.

The number of the angles in the actual reproduction image and the readout bit rate can be calculated on the basis of the data quantity, etc., of the ILVU by analysis of the PCI and DSI contained in each ILVU. Therefore, only when the data transfer rate from the data read unit 11 to the RAM 26 is greater than the value obtained by multiplying the number of the angles in the actual reproduction image and the readout bit rate, it may be designed to execute the operation of this embodiment that stores the data of all the angles in the RAM 26.

Further, in case of the storage capacity of the RAM 26 being small, instead of storing the ILVU corresponding to all the angles, only the ILVU corresponding to part of the angles may be stored. For example, only the ILVU corresponding to the angle 1 through the angle 4 out of the ILVU contained in the ILVB can be stored, and when the angle switching to any one of the angle 1 through the angle 4 is instructed, the decoding of the ILVU after the angle switching is executed next to the ILVU before the angle switching being the decoding object at that moment of the angle switching, whereby a quick angle switching is achieved. When the angle switching to any one of the angle 5 through the angel 9 is instructed, in the same manner as the conventional DVD reproduction device 500 shown in FIG. 15, the data readout is made to be carried out after the angle switching instruction, from the ILVU of the angle after switching which has newly been stored in the RAM 26.

2. Second Embodiment (1) Total Configuration of the DVD Reproduction Device

Another embodiment takes on the same configuration as the first embodiment, which was described with reference to FIG. 8. The particular aspects of the second embodiment are described below.

In the multi-angle reproduction operation, the servo controller 18 executes, in accordance with an instruction by the system controller 60, various servo controls so as to read out the ILVU corresponding to an angle selected out of the angle blocks constituting the ILVB from the DVD 10 one by one in the order of the reproduction time zone.

In the multi-angle reproduction operation, the digital signal processor 24 stores in the RAM 26 the ILVU sequentially inputted in the order of the reproduction time zone. The digital signal processor 24 reads, in accordance with an instruction by the system controller 60, the ILVU stored in the RAM 26 in the order of the reproduction time zone, and outputs the VOBU constituting the ILVU to the decoding unit 28. When the angle switching is instructed, the digital signal processor 24 replaces, in accordance with the instruction by the system controller 60, the ILVU stored in the RAM 26 before the angle switching and before the readout with the ILVU after the angle switching being inputted from then on.

Further, in the multi-angle reproduction operation, the system controller 60 issues various servo instructions to the servo controller 18 so as to read out the ILVU corresponding to an angle selected out of the angle blocks constituting the ILVB, from the DVD 10 one by one in the order of the reproduction time zone. Also, the system controller 60 instructs the digital signal processor 24 to read out the ILVU stored in the RAM 26 in the order of the reproduction time zone, and to output the VOBU constituting the ILVU to the decoding unit 28.

The system controller 60 also generates angle information corresponding to the ILVU stored in the RAM 26, and writes the angle information in part of the storage area in the RAM 26. The angle information includes a block number of an angle block which the corresponding ILVU belongs to, and addresses and data quantities in the DVD 10 of the ILVU belonging to the angle block. The block number of the angle block is assigned in the order of the reproduction time zone. In the angle blocks (AGL_BLK#1–AGL_BLK#4) as shown in FIG. 6, for example, the block number 1 is assigned to AGL_BLK#1 corresponding to the initial reproduction time zone, the block number 2 is assigned to AGL_BLK#2 corresponding to the second reproduction time zone, the block number 3 is assigned to AGL_BLK#3 corresponding to the third reproduction time zone, and the block number 4 is assigned to AGL_BLK#4 corresponding to the last reproduction time zone. Further, the addresses and data quantities in the DVD 10 of the ILVU belonging to the angle block are obtained by analyzing the seamless reproduction angle information (SML_AGLI) contained in the DSI.

Figure 12:
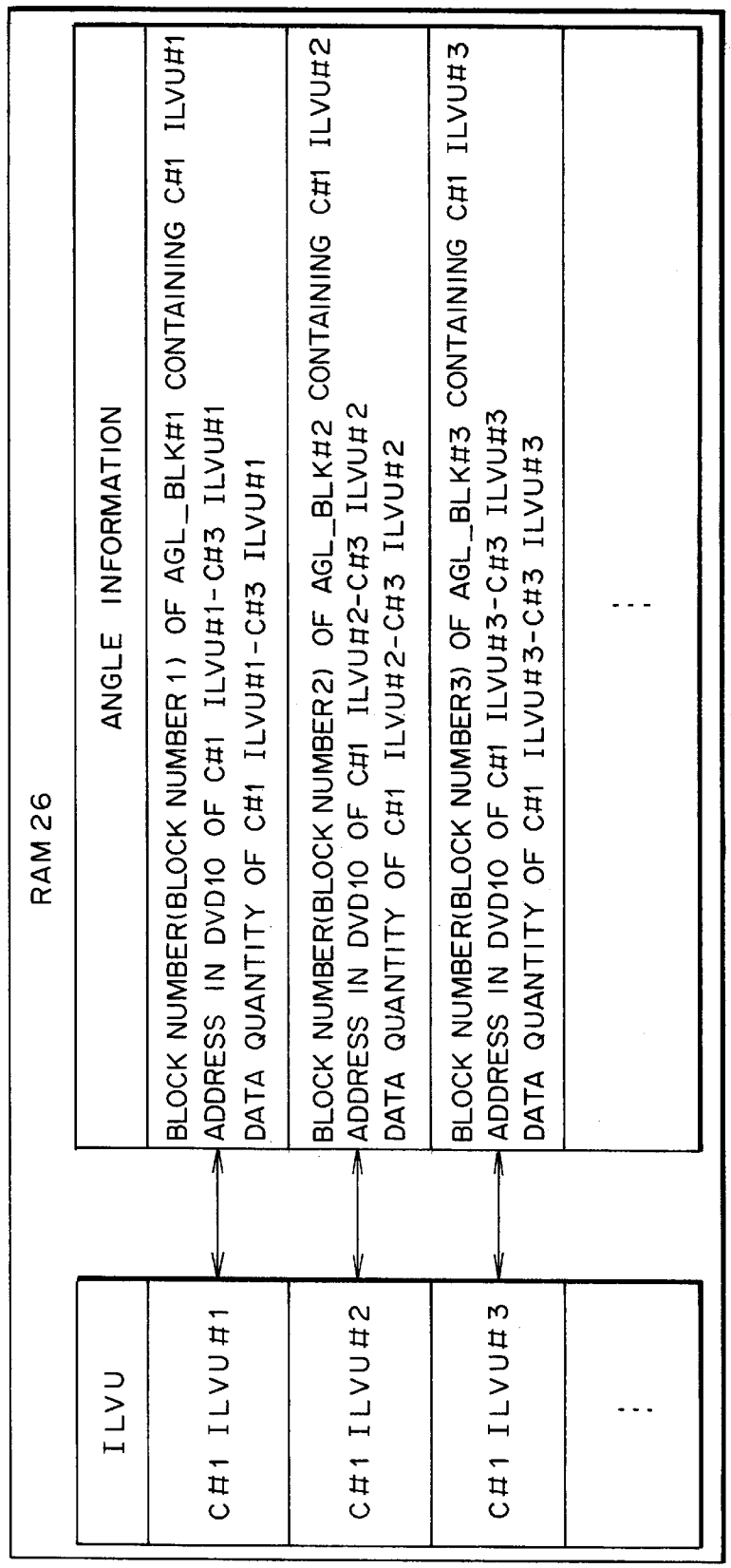
FIG. 12 is a chart illustrating the correspondence between the ILVU stored in the RAM and the angle information in another embodiment of the DVD reproduction device.

FIG. 12 illustrates the correspondence between the ILVU stored in the RAM 26 and the angle information. When the ILVU is configured as shown in FIG. 6 and the angle 1 is selected, the RAM 26 has the ILVU stored in the order of C#1ILVU#1, C#1ILVU#2, C#1ILVU#3. To the angle information corresponding to C#1ILVU#1, for example, are set the block number (block number 1) of the angle block (AGL_BLK#1) to which C#1ILVU#1 belongs, and the addresses and data quantities in the DVD 10 of the ILVU (C#1ILVU#1, C#2ILVU#1, C#3ILVU#1) belonging to AGL_BLK#1.

When the user instructs the angle switching by pressing the key provided on the operation unit 58, the system controller 60 judges whether there is any ILVU that can be replaced by the ILVU after the angle switching with regard to the ILVU (ILVU before the angle switching, stored in the RAM 26) being the decoding object next and after the ILVU that was read from the RAM 26 at the moment of the switching instruction and is the decoding object.

Specifically, the system controller 60 recognizes the data quantity of the ILVU that was read at that time from the RAM 26 and is the decoding object, on the basis of the angle information stored in the RAM 26. Further, the system controller 60 calculates the maximum transfer rate between the RAM 26 and the decoding unit 28 which is defined in relation to the positions in the RAM 26 of the ILVU that was read at that time from the RAM 26 and is the decoding object, and the ILVU being the reproduction object before and after that time. The system controller 60 divides the data quantity of the ILVU that was read at that time from the RAM 26 and is the decoding object by the maximum transfer rate between the RAM 26 and the decoding unit 28, and thereby calculates the reproduction time of the ILVU that was read at that time from the RAM 26 and is the decoding object. Next, the system controller 60 subtracts, from the above reproduction time, the elapsed time from the start of transferring the VOBU that constitute the ILVU that was read at that time from the RAM 26 and is the decoding object to the decoding unit 28, and thereby calculates the residual time (hereunder, referred to as the residual reproduction time) until the termination of reproducing the ILVU that was read at that time from the RAM 26 and is the decoding object.

The system controller 60 recognizes, on the basis of the angle information stored in the RAM 26, the address in the DVD 10 of the ILVU last stored in the RAM 26, and the address in the DVD 10 of the ILVU after the angel switching, which is a replacement candidate of the ILVU before the angle switching that becomes the decoding object next to the ILVU that was read at that time from the RAM 26 and is the decoding object; and thereby the system controller 60 calculates the time required for searching the data of the ILVU after the angle switching. Next, the system controller 60 recognizes the data quantity of the ILVU after the angle switching being the replacement candidate on the basis of the angle information. The system controller 60 calculates the time (hereunder, referred to as "read time") from the reading of the ILVU after the angle switching being the replacement candidate out of the DVD 10 until storing it in the RAM 26, on the basis of the search time for the data, the data quantity of the ILVU after the angle switching being the replacement candidate, and the transfer rate between the data read unit 11 and the RAM 26.

When the read time is shorter than the residual reproduction time, since the image is not intermittent in the seamless switching, the system controller 60 judges it possible to replace the ILVU before the angle switching being the decoding object by the ILVU after the angle switching, next and after the ILVU that was read at that time from the RAM 26 and is the decoding object. On the basis of the angle information, the controller 60 controls to read the ILVU after the angle switching being the replacement candidate from the DVD 10, and to replace the ILVU before the angle switching stored in the RAM 26 by the above ILVU after the angle switching.

When the read time is longer than the residual reproduction time, since the image can be intermittent in the seamless switching, the system controller 60 judges it not possible to replace the ILVU before the angle switching being the decoding object by the ILVU after the angle switching, next to the ILVU that was read at that time from the RAM 26 and is the decoding object. The system controller 60 repeats the judgment in the same manner with regard to each of the ILVU before the angle switching being the decoding object, as to whether it can be replaced by the ILVU after the angle switching, next and after the ILVU before the angle switching that is not replaceable. The system controller 60 thereby judges whether it is possible to replace which ILVU from then on out of the ILVU before the angle switching stored in the RAM 26 by the ILVU after the angle switching. If the replacement is possible, the system controller 60 will execute the control, on the basis of the angle information, that reads the ILVU after the angle switching being the replacement candidate from the DVD 10, and replaces the ILVU before the angle switching stored in the RAM 26 by the above ILVU after the angle switching.

When all the ILVU before the angle switching stored in the RAM 26 are not replaceable, the system controller 60 executes the normal angle switching control. That is, the system controller 60 does not execute the replacement of the ILVU before the angle switching stored in the RAM 26, and controls, in regard to the ILVU that is read from the DVD 10 next, to read the ILVU after the angle switching and store it in the RAM 26.

FIG. 13 illustrates an example of replacement and transition of the ILVU. Here, the ILVU is assumed to be configured as shown in FIG. 6. Suppose a case that the switching to the angle 2 is instructed, when the ILVU (C#1ILVU#1, C#1ILVU#2, C#1ILVU#3) corresponding to the angle 1 are stored in the RAM 26, as shown in FIG. 13(A), and C#1ILVU#1 is read out to be the decoding object.

In this case, the system controller 60 recognizes the data quantity of C#1ILVU#1 that was read at that time from the RAM 26 and is the decoding object, on the basis of the angle information stored in the RAM 26, calculates the reproduction time of C#1ILVU#1 based on this data quantity and the maximum transfer rate between the RAM 26 and the decoding unit 28, subtracts, from the above reproduction time, the elapsed time from the start of transferring the VOBU that constitute C#2ILVU#1 to the decoding unit 28, and thereby calculates the residual time until the termination of reproduction of C#1ILVU#1. Also, the system controller 60 recognizes, on the basis of the angle information stored in the RAM 26, the address in the DVD 10 of C#1ILVU#3 last stored in the RAM 26. Next, based on the angle information, the system controller 60 recognizes the address in the DVD 10 of C#2ILVU#2 being a replacement candidate of the ILVU (C#1ILVU#2) that becomes the decoding object next to C#1ILVU#1, and thereby calculates the data search time of C#2ILVU#2. Next, the system controller 60 calculates the time from the reading of C#2ILVU#2 being the replacement candidate from the DVD 10 until storing it in the RAM 26, on the basis of these data search time, the data quantity of C#2ILVU#2, and the transfer rate between the data read unit 11 and the RAM 26.

When the time for reading C#2ILVU#2 being the replacement candidate from the DVD 10 until storing it in the RAM 26 is shorter than the residual time until the termination of the decoding of C#1ILVU#1 that was read at that time from the RAM 26 and is the decoding object, the system controller 60 judges it replaceable, and controls, as shown in FIG. 13(B), to read C#2ILVU#2 and C#2ILVU#3 from the DVD 10, and to replace C#1ILVU#2 and C#1ILVU#3 by C#2ILVU#2 and C#2ILVU#3.

When the time for reading C#2ILVU#2 being the replacement candidate from the DVD 10 until storing it in the RAM 26 is not shorter than the residual time until the termination of the decoding of C#1ILVU#1 that was read at that time from the RAM 26 and is the decoding object, the system controller 60 judges it irreplaceable, and judges in the same procedure as the above whether it is possible to replace the ILVU (C#1ILVU#3) that is the decoding object next to C#1ILVU#2 by C#2ILVU#3. If it is replaceable, the system controller 60 will execute the control, as shown in FIG. 13(C), that reads C#2ILVU#3 from the DVD 10, and replaces C#1ILVU#3 by C#2ILVU#3. If it is irreplaceable, on the other hand, the system controller 60 will not execute the control for replacement, and will control to read C#2ILVU#4 from the DVD 10 and store it in the RAM 26.

In this embodiment, the data read unit 11, RF amplifier 22, digital signal processor 24, and system controller 60 correspond to the signal processing means; the RAM 26 corresponds to the data storage means; the system controller corresponds to re-read instruction means and the angle information generation means; the digital signal processor 24 corresponds to the data replacement means; and the decoding unit 28, video processor 44, video encoder 46, and system controller 60 correspond to the reproduction means.

(2) Operation of the DVD Reproduction Device

Figure 14:
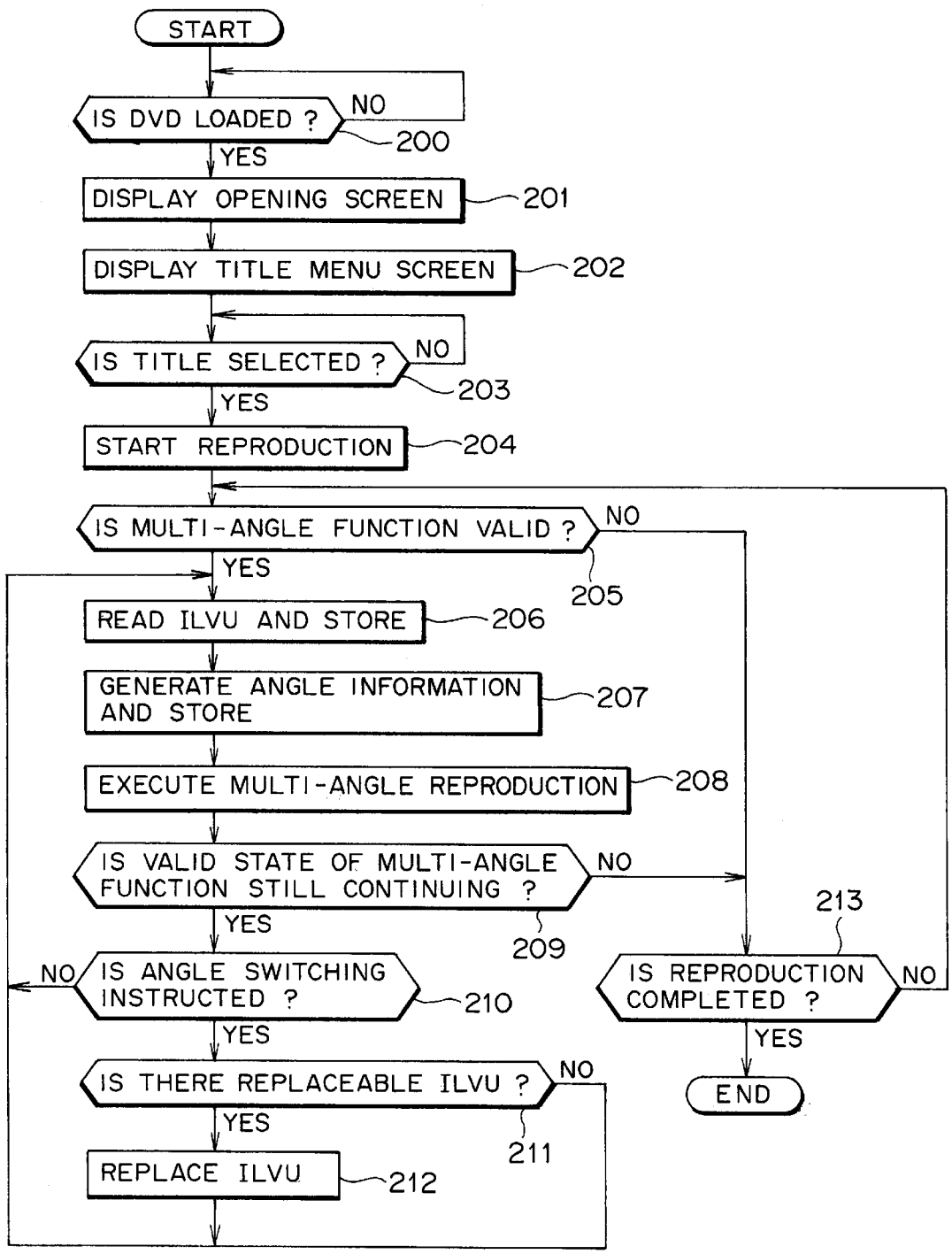
FIG. 14 is a flow chart illustrating the processing procedure of the multi-angle reproduction operation in the DVD reproduction device.

Next, the operation of the aforementioned second embodiment of DVD reproduction device 100 will be explained. FIG. 14 illustrates the processing procedure of the multi-angle reproduction operation in the second embodiment of DVD reproduction device 100. The system controller 60 judges whether a user has loaded the DVD 10 into the DVD reproduction device 100 or not (step 200). When the DVD 10 is loaded, next the system controller 60 displays the opening display screen for a certain period of time (step 201), and then displays the title menu screen (step 202). Based on the program chain information (PGCI) contained in the video manager (VMG), for example, the video object (VOB) corresponding to the opening screen is read, and the specific opening display screen is presented on the display unit. Since the item to be reproduced on the title menu displayed next to the opening screen can be specified on the basis of the program chain information unit table (PGCI_UT) in the VMGI, subsequently the display operation of the title menu is started.

Next, the system controller 60 judges whether a title is selected or not (step 203). When the user operates the cursor key on the operation unit 58, points the cursor to a title displayed on the title menu, and presses the setting key to determine the selection of the title, the system controller 60 starts the reproduction of the selected title (step 204).

Next, the system controller 60 judges whether the ILVB becomes the processing object and the multi-angle function becomes valid or not (step 205). If the multi-angle function becomes valid, the system controller 60 will control to read the ILVU corresponding to the angle selected out of the angle blocks constituting the ILVB from the DVD 10 one by one in the order of the reproduction time zone, and to sequentially store them in the RAM 26 (step 206). For example, if the ILVB shown in FIG. 6 becomes the processing object, and the angle 1 is selected at the initial setting, C#1ILVU#1, C#1ILVU#2, C#1ILVU#3, and C#1ILVU#4 will sequentially be read and stored in the RAM 26.

Also, the system controller 60 generates angle information corresponding to the ILVU stored in the RAM 26, and stores the angle information in the RAM 26 (step 207).

Next, the system controller 60 reads the ILVU stored in the RAM 26 in the order of the reproduction time zone, makes the decoding unit 28 execute the decoding, and thereby implements the multi-angle reproduction operation (step 208).

When the multi-angle operation is started, the system controller 60 analyzes the DSI of the NV_PCK located at the head of the ILVU that has become an object of the decoding at step 208, and thereby judges whether the valid state of the multi-angle function is continued or not (step 209).

If the multi-angle function continues the valid state, the system controller 60 will judge whether the user has pressed the angle switching key provided on the operation unit 58 to thereby instruct the angle switching (step 210). If the angle switching is instructed, the system controller 60 will judge whether there is any ILVU that can be replaced by the ILVU after the angle switching with regard to the ILVU (ILVU before the, angle switching, stored in the RAM 26) being the decoding object next and after the ILVU that was read from the RAM 26 at the moment of the switching instruction and is the decoding object (step 211).

If there is a replaceable ILVU, the system controller 60 will read the ILVU after the angle switching being a replacement candidate from the DVD 10 to store it in the RAM 26, and thereby control to replace the ILVU before the angle switching by the ILVU after the angle switching (step 212). Thereafter, the system controller 60 repeats the control operation from the step 206, in which in regard to the ILVU next read from the DVD 10, the ILVU corresponding to the angle after switching selected out of the angle blocks constituting the ILVB is read from the DVD 10 one by one in the order of the reproduction time zone, and is sequentially stored in the RAM 26.

Further, if all the ILVU before the angle switching stored in the RAM 26 are irreplaceable (negative judgment at step 211), the system controller 60 will not replace the ILVU, but will repeat the control operation from the step 206, in which in regard to the ILVU next read from the DVD 10, the ILVU corresponding to the angle after switching selected out of the angle blocks constituting the ILVB is read from the DVD 10 one by one in the order of the reproduction time zone, and is sequentially stored in the RAM 26.

Also, if the angle switching is not instructed (negative judgment at step 210), the system controller 60 will repeat the control operation from the step 206, in which the ILVU corresponding to the angle presently selected is read from the DVD 10 one by one in the order of the reproduction time zone, and is sequentially stored in the RAM 26.

If the multi-angle reproduction function is not valid (negative judgment at step 205), or if the multi-angle reproduction function is not continued in the valid state (negative judgment at step 209), the system controller 60 will judge whether the reproduction of the title is terminated (step 213). If the reproduction of the title is terminated, a series of the reproduction will be completed. If the reproduction of the title is not terminated, it will be judged again whether the multi-angle function becomes valid (step 205).

Thus, the DVD reproduction device 100 of this embodiment reads in advance the ILVU corresponding to the selected angle from the DVD 10 and stores them in the RAM 26. When there occurs an angle switching, it is judged whether the ILVU before the angle switching stored in the RAM 26 can be replaced by the ILVU after the angle switching without the reproduced image becoming intermittent. When it is judged replaceable, since the ILVU before the angle switching is replaced by the ILVU after the angle switching, the ILVU after the angle switching can be adopted as a decoding object in an earlier stage, and a quick angle switching becomes possible without making the reproduced image intermittent.

Further, the DVD reproduction device 100 of this embodiment generates the angle information in correspondence with the ILVU stored in the RAM 26, in which are set the block number of the angle block that the corresponding ILVU belongs to, and the addresses and data quantities in the DVD 10 of the ILVU belonging to the angle block. Therefore, on the basis of this angle information, whether the ILVU is replaceable can easily be judged, and a quick readout of the ILVU from the DVD 10 after the angle switching becomes possible.

Thus, according to this invention, the compression data corresponding to each of different plural angles of the image with one reproduction timing are put into storage, and when the angle being a reproduction object is switched, the compression data corresponding to an angle after switching already stored is read, thus executing the reproduction of the image. Therefore, when the angle switching is instructed, the compression data of the angle after switching newly stored thereafter is not read out, but the compression data of the angle after switching having already been stored is employed, and thereby a reproduction operation corresponding to the angle after switching can be executed, thus achieving a swift angle switching in the multi-angle reproduction operation.

Further, according to the invention, when a photographing direction is selected, the reproduction data having the same reproduction timing as that of the reproduction data having already stored is read from the disk type recording medium, in correspondence with the selected photographing direction, whereby the reproduction data having already been stored is replaced. Accordingly, without reproducing the reproduction data having already been stored as the conventional, the reproduction data corresponding to the selected photographing direction can be reproduced earlier, thus implementing a quick switching of the photographing direction.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A disk reproduction device, comprising:
    a signal processing means that reads signals recorded in a disk type recording medium, and outputs compression data corresponding to an image;
    a data storage means distinct from the disk type recording medium that stores the compression data corresponding to each of different plural angles of the image with one reproduction timing; and
    a data reproduction means that, when the angle being a reproduction object is switched, reads the compression data corresponding to an angle after switching stored in the data storage means, and executes a reproduction operation of the image.

2. A disk reproduction device as claimed in claim 1, wherein:
    the data storage means stores the compression data corresponding to each of the different plural angles in a unit of an interleaved unit, and
    the data reproduction means switches the compression data being a readout object in a unit of the interleaved unit.

3. A disk reproduction device as claimed in claim 1, wherein, in a reproduction zone where a multi-angle function is not used, or when there is surplus storage area in the data storage means although the multi-angle function is used, the surplus storage area is employed as a track buffer for absorbing vibrations.

4. A disk reproduction device as claimed in claim 2, wherein, the data storage means contains storage areas corresponding to each of the different plural angles, and the signal processing means subsequently stores all the interleaved units contained in an interleaved block of a processing object in the storage areas.

5. A disk reproduction device as claimed in claim 1 or 2, wherein the signal processing means subsequently reads all the interleaved units contained in an interleaved block of a processing object from the disk type recording medium in the order of reproduction time zones, and stores them in the data storage means.

6. A disk reproduction device as claimed in claim 2, wherein, when a multi-angle reproduction operation is started, the signal processing means judges whether a valid state of a multi-angle function is continued on the basis of a data search information of a navigation pack located at the head of the interleaved unit that has become an object of a decoding processing.

7. A disk reproduction device as claimed in claim 1 or 2, wherein, only when a data transfer rate at which the compression data read from the disk type recording medium is stored in the data storage means is greater than a value obtained by multiplying the number of the plural angles and a readout bit rate at which the data is read from the data storage means, the data storage means stores the compression data corresponding to each of the different plural angles.

8. A disk reproduction device as claimed in claim 2, wherein, when a storage capacity of the data storage means is small, instead of storing the interleaved units corresponding to all the angles, the data storage means stores only the interleaved units corresponding to part of the angles.

9. A disk reproduction device, comprising:
a signal processing means that reads signals recorded in a disk type recording medium, and outputs compression data corresponding to an image;
a data storage means that selectively stores the compression data corresponding to each of different plural angles of the image with one reproduction timing;
a re-read instruction means that, when the angle being a reproduction object is switched, issues an instruction to the signal processing means to read the compression data corresponding to an angle after switching, of which reproduction timing is the same, with regard to the compression data corresponding to the angle before switching stored in the data storage means, of which reproduction operation is not executed;
a data replacement means that replaces the compression data of the angle after switching, read in accordance with the instruction by the re-read instruction means, for the compression data of the angle before switching; and
a data reproduction means that reads the compression data stored in the data storage means, and executes the reproduction operation of the image.

10. A disk reproduction device as claimed in claim 9, further comprising an angle information generation means that, when storing the compression data corresponding to any one of the angles in the data storage means, generates angle information necessary for reading the compression data corresponding to the other angles with the same reproduction timing, and stores the angle information in association with the compression data in the data storage means.

11. A disk reproduction device as claimed in claim 9, wherein the re-read instruction means designates a read position of the compression data corresponding to the angle after switching, so that a replacement of the compression data corresponding to the angle before switching with the compression data corresponding to the angle after switching does not make a reproduction image intermittent.

12. A disk reproduction device, comprising:
a signal processing means that reads signals recorded in a disk type recording medium, and outputs compression data corresponding to an image;
a data storage means that stores the compression data corresponding to each of different plural angles of the image with one reproduction timing, in a unit of an interleaved unit;
a re-read instruction means that, when the angle being a reproduction object is switched, issues an instruction to the signal processing means to read the compression data corresponding to an angle after switching, of which reproduction timing is the same with regard to the compression data corresponding to the angle before switching stored in the data storage means, of which reproduction operation is not executed;
a data replacement means that replaces the compression data of the angle after switching, read in accordance with the instruction by the re-read instruction means, for the compression data of the angle before switching; and
a data reproduction means that reads the compression data stored in the data storage means, and executes the reproduction operation of the image.

13. A disk reproduction device as claimed in claim 12, wherein the data reproduction means switches the compression data being a readout object in a unit of the interleaved unit.

14. A disk reproduction device as claimed in claim 12, wherein the re-read instruction means designates a read position of the compression data corresponding to the angle after switching, so that a replacement of the compression data corresponding to the angle before switching with the compression data corresponding to the angle after switching does not make a reproduction image intermittent.

15. A disk reproduction device as claimed in claim 12, further comprising an angle information generation means that, when storing the compression data corresponding to any one of the angles in the data storage means, generates angle information necessary for reading the compression data corresponding to the other angles with the same reproduction timing, and stores the angle information in association with the compression data in the data storage means.

16. A disk reproduction device as claimed in claim 15, wherein the angle information includes an angle block number that the corresponding interleaved unit belongs to.

17. A disk reproduction device as claimed in claim 15, wherein the angle information includes an angle block number that the corresponding interleaved unit belongs to, and an address in the recording medium of the interleaved unit belonging to the angle block.

18. A disk reproduction device as claimed in claim 15, wherein the angle information includes an angle block number that the corresponding interleaved unit belongs to, and an address and data quantity in the recording medium of the interleaved unit belonging to the angle block.

19. A disk reproduction device as claimed in claim 17, wherein the addresses in the recording medium of the interleaved units belonging to the angle block are obtained by seamless angle information contained in data search information.

20. A disk reproduction device as claimed in claim 18, wherein the addresses and data quantities in the recording medium of the interleaved units belonging to the angle block are obtained by seamless angle information contained in data search information.

* * * * *